United States Patent
Kiiskila et al.

(10) Patent No.: US 9,268,552 B1
(45) Date of Patent: Feb. 23, 2016

(54) PATCHING IMPROVEMENT FOR EXECUTABLES IN MEMORY CONSTRAINED DEVICES

(71) Applicant: Ayla Networks, Inc., Sunnyvale, CA (US)

(72) Inventors: Marko Kiiskila, Sunnyvale, CA (US); Joseph R. Eykholt, Los Altos, CA (US)

(73) Assignee: Ayla Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/307,306

(22) Filed: Jun. 17, 2014

Related U.S. Application Data

(60) Provisional application No. 61/836,546, filed on Jun. 18, 2013.

(51) Int. Cl.
*G06F 9/445* (2006.01)
*G06F 9/44* (2006.01)

(52) U.S. Cl.
CPC .. *G06F 8/65* (2013.01); *G06F 8/68* (2013.01); *G06F 9/44521* (2013.01)

(58) Field of Classification Search
CPC .......... G06F 8/65; G06F 8/68; G06F 9/44521
See application file for complete search history.

(56) References Cited

U.S. PATENT DOCUMENTS

| | | | | |
|---|---|---|---|---|
| 6,077,315 A * | 6/2000 | Greenbaum | ........ | G06F 9/44521 712/E9.024 |
| 6,240,500 B1 * | 5/2001 | Scales | ................ | G06F 9/44521 711/170 |
| 6,708,330 B1 * | 3/2004 | Moberg | .............. | G06F 9/44521 711/118 |
| 7,340,736 B2 * | 3/2008 | Yang | ...................... | G06F 8/665 711/E12.008 |
| 7,503,040 B2 * | 3/2009 | Wiebe | ...................... | G06F 8/54 713/151 |
| 7,676,803 B2 * | 3/2010 | Zhao | ........................ | G06F 8/65 717/168 |
| 7,694,291 B2 * | 4/2010 | Chen | ........................ | G06F 8/71 717/162 |
| 7,861,211 B2 * | 12/2010 | Rao | .......................... | G06F 8/65 717/100 |
| 8,578,359 B2 * | 11/2013 | Meller | ...................... | G06F 8/68 717/122 |
| 2002/0188929 A1 * | 12/2002 | Cyran | ................ | G06F 9/44521 717/125 |
| 2004/0098420 A1 * | 5/2004 | Peng | ........................ | G06F 8/68 |

(Continued)

OTHER PUBLICATIONS

Koshy, J.; Pandey, R., Remote incremental linking for energy-efficient reprogramming of sensor networks, [Online] 2005, Wireless Sensor Networks, 2005. Proceeedings of the Second European Workshop, [Retrieved from the Internet] <http://ieeexplore.ieee.org/stamp/stamp.jsp?tp=&arnumber=1462027&isnumber=31391> pp. 354-365.*

(Continued)

*Primary Examiner* — Thuy Dao
*Assistant Examiner* — Ravi K Sinha
(74) *Attorney, Agent, or Firm* — Lowenstein Sandler LLP

(57) ABSTRACT

A processing device determines a memory layout for an executable comprising a plurality of functions and data, wherein the memory layout is determined based on one or more object files. The processing device updates the memory layout by inserting an unused memory region between a first function and a second function of the plurality of functions in the memory layout, wherein the first function and the second function have adjacent memory locations in the memory layout prior to insertion of the unused memory region. The processing device resolves references between the plurality of functions. The processing device then generates an executable comprising the plurality of functions and the data arranged in accordance with the memory layout, the executable having the resolved references.

20 Claims, 11 Drawing Sheets

(56) References Cited

U.S. PATENT DOCUMENTS

| | | | | |
|---|---|---|---|---|
| 2004/0205307 | A1* | 10/2004 | Pullen | G06F 8/4442 711/158 |
| 2004/0205697 | A1* | 10/2004 | Hylands | G06F 9/44521 717/106 |
| 2005/0102660 | A1* | 5/2005 | Chen et al. | 717/168 |
| 2005/0278715 | A1* | 12/2005 | Herle | G06F 8/68 717/162 |
| 2006/0161909 | A1* | 7/2006 | Pandey et al. | 717/168 |
| 2007/0079306 | A1* | 4/2007 | Qumei | G06F 8/68 717/168 |
| 2007/0220504 | A1* | 9/2007 | Eker | 717/168 |
| 2009/0070374 | A1* | 3/2009 | Eker | G06F 8/68 |
| 2009/0113386 | A1* | 4/2009 | Eker et al. | 717/108 |
| 2009/0172338 | A1* | 7/2009 | Eker | G06F 8/68 711/173 |
| 2010/0037215 | A1* | 2/2010 | Meiss | G06F 8/65 717/168 |
| 2010/0325622 | A1* | 12/2010 | Morton | G06F 8/68 717/168 |
| 2011/0145472 | A1* | 6/2011 | Whitehouse | G06F 8/65 711/103 |
| 2013/0014275 | A1* | 1/2013 | Goodes et al. | 726/26 |
| 2014/0059525 | A1* | 2/2014 | Jawa | G06F 9/44521 717/162 |
| 2014/0282446 | A1* | 9/2014 | Debate | G06F 9/44521 717/145 |

OTHER PUBLICATIONS

Russell W. Quong and Mark A. Linton, Linking programs incrementally, [Online] Jan. 1991 ACM Trans. Program. Lang. Syst. 13, 1 (Jan. 1991), [Retrieved from the Internet] <http://doi.acm.org/10.1145/114005.102804> pp. 1-20.*

Carl von Platen and Johan Eker, Feedback linking: optimizing object code layout for updates, [Online] 2006, SIGPLAN Not. 41, 7 (Jun. 2006), [Retrieved from the Internet] <http://doi.acm.org/10.1145/1159974.1134653> pp. 2-11.*

Heo et al., Energy efficient program updating for sensor nodes with flash memory, [Online] 2010, In Proceedings of the 2010 ACM Symposium on Applied Computing (SAC '10). ACM, New York, NY, USA, [Retrieved from the Internet] <http://doi.acm.org/10.1145/1774088.1774128> pp. 194-200.*

Dong et al., R2: Incremental Reprogramming Using Relocatable Code in Networked Embedded Systems, [Online] 2013, in Computers, IEEE Transactions on, vol. 62, No. 9, Sep. 2013, [Retrieved from the Internet] <http://ieeexplore.ieee.org/stamp/stamp.jsp?tp=&arnumber=6226371&isnumber=6568861> pp. 1837-1849.*

* cited by examiner

PATCHING IMPROVEMENT FOR EXECUTABLES IN MEMORY CONSTRAINED DEVICES

RELATED APPLICATIONS

This patent application claims the benefit under 35 U.S.C. §119(e) of U.S. Provisional Application No. 61/836,546, filed Jun. 18, 2013.

BACKGROUND

Many modern appliances, consumer devices, and other devices include embedded systems that are configured to perform one or more dedicated functions. Frequently, developers of the embedded systems develop patches to update firmware for the embedded system to fix bugs and/or add new functionality.

Updates to computer software and to firmware can be delivered as patches. A patch is not a complete piece of software or firmware. Instead, a patch describes a set of changes that will turn one version of software or firmware into another. This process of taking an original piece of code and applying the patch is called patching. When source files change, a common change is to add some new instructions in. The effect of this is that all the functions and data that are after the added instructions will have a different offset inside the executable file. Instructions that reference these memory locations, e.g. a function call, typically then have to be changed from original version for the patched version. As a result, patches are frequently nearly the size of the original executable. For resource-constrained devices such as embedded systems, the extra memory capacity used by the patch can be restrictive and impair the ability to make patches on such devices.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Embodiments are directed to a system that generates and/or performs software and firmware patches in a space efficient manner, to methods of performing such patching, and to the patches used to update versions of software and firmware. In one embodiment, the patches are used to patch software or firmware of an embedded system or other resource-constrained device. Alternatively, the patches may be used on resource abundant devices such as desktop computers, mobile phones, tablet computers, and so forth.

In one embodiment, a processing device determines a memory layout for an executable having functions and data (e.g., statically allocated data such as variables), wherein the memory layout is determined based on one or more object files. The processing device updates the memory layout by inserting an unused memory region (padding) between a first function and a second function in the memory layout, wherein the first function and the second function have adjacent memory locations in the memory layout prior to insertion of the unused memory region. The processing device resolves references between the functions, and then generates an executable comprising the functions and the data arranged in accordance with the memory layout, the executable having the resolved references.

Executables created in accordance with embodiments described herein enable functions and data to grow between versions of the executables without changing the memory locations of subsequent functions or data and without changing call instructions to such functions or data. This reduces the size of patches to such executables, which in turn increases the amount of memory in a memory constrained device that can be consumed by the executable.

Figure 1:
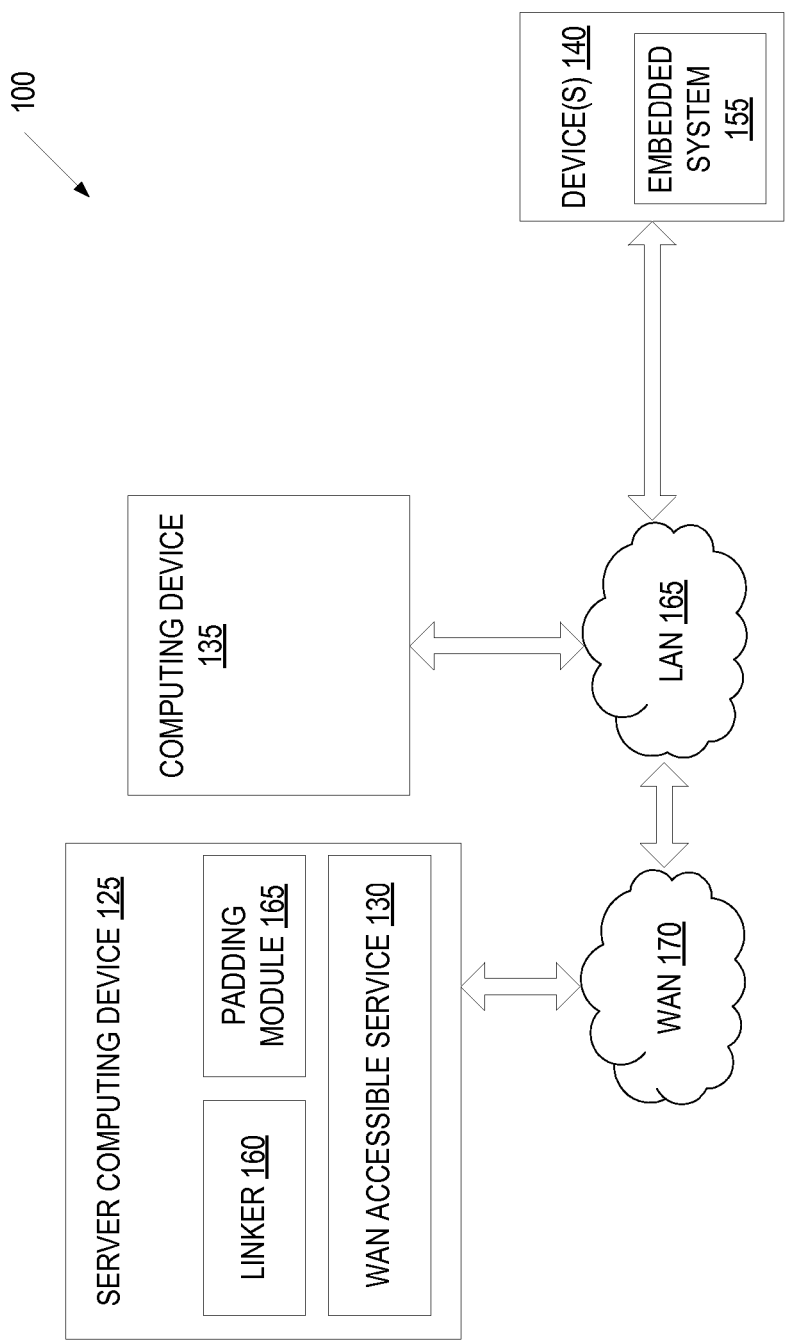
FIG. 1 illustrates one example client-server architecture, in accordance with embodiments described herein.

FIG. 1 illustrates one example client-server architecture 100, in accordance with embodiments described herein. In one embodiment, the client-server architecture 100 includes a server computing device 125 connected to one or more client devices 140 via a local area network (LAN) 115 and a connected wide area network (WAN) 110. The WAN 170 may be a public network (e.g., the Internet), a private network (e.g., an intranet), or a combination thereof.

In one embodiment, the client devices 140 are devices having embedded systems 155. Examples of such client devices 140 include electrical appliances such as refrigerators, ovens, washers, driers, dishwashers, thermostats, alarms, air conditioners, televisions, radios, receivers, amplifiers, and so forth. The devices 140 may also include consumer devices such as digital watches, music players, game consoles, digital cameras, printers, and so forth. Other examples of devices 140 include stationary devices such as HVAC systems, traffic lights, factory controllers, signs, electronic billboards, sprinkler systems, and irrigation control systems, as well as medical devices. Devices 140 may also be any other type of device that includes an embedded system 155. Alternatively, one or more client devices 140 may not include an embedded system. Examples of such devices include notebook computers, laptop computers, tablet computers, mobile phones, game consoles, smart televisions, desktop computers, server computers, and other computing devices.

An embedded system 155 is a class of computing device that is embedded into another device 140 as one component of the device 140. The device 140 typically also includes other hardware, electrical and/or mechanical components that may interface with the embedded system. Embedded systems 155 are typically configured to handle a particular task or set of tasks, for which the embedded systems 155 may be optimized. Accordingly, the embedded systems 155 may have a minimal cost and size as compared to general computing devices.

The embedded system 155 may include a communication module (not shown) that enables the embedded system 155 (and thus the device 140) to connect to the LAN 165. The communication module may be configured to manage security, manage sessions, manage communications with external devices, and so forth. In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. One example of an embedded system is described in greater detail below with reference to FIG. 8.

Referring back to FIG. 1, the LAN 165 may include a router, switch, bridge or other network device (not shown) that enables communication between multiple devices (e.g., devices 140, a computing device 135, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 155 may not support any of the communication types supported by the network device. For example, device 140 may support only Zigbee or only Bluetooth. To enable such devices to connect to the LAN 165, the LAN 165 may include a gateway device (not shown) connected to the network device via one of the connection types supported by the network device (e.g., via Ethernet or Wi-Fi). The gateway device may additionally support other communication protocols such as Zigbee, PLC and/or Bluetooth, and may translate between supported communication protocols. Accordingly, some devices 140 may connect to the LAN 165 through the gateway device.

The LAN 165 is connected to a WAN 170. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to server computing device 125. The server computing device 125 may include a physical machine and/or a virtual machine hosted by a physical machine. The physical machine may be a rackmount server, a desktop computer, or other computing device. In one embodiment, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a WAN accessible service 130, which may be a web based service and/or a cloud service (e.g., a web based service hosted in a cloud computing platform). The WAN accessible service 130 may maintain a session (e.g., via a transmission control protocol (TCP) connection or universal datagram protocol (UDP) traffic) with one or more of the embedded systems 145 (or with client devices 140 and/or other computing devices such as computing device 135). Via a session with an embedded system 145, WAN accessible service 130 may issue commands to the embedded system, send notifications to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

On occasion the WAN accessible service 130 may send patches and/or other updates to devices 140 to update firmware and/or software in the embedded system 155. The patches and/or other updates may update firmware or software in a host memory or in a memory of a communication module of the embedded system 815. The available memory resources of both the host memory and the memory of the communication module may be limited. Accordingly, the firmware and/or software installed on one or more components of the embedded system 155 may be generated to have padding between functions and/or statically allocated data to minimize the size of patches and updates.

Figure 2:
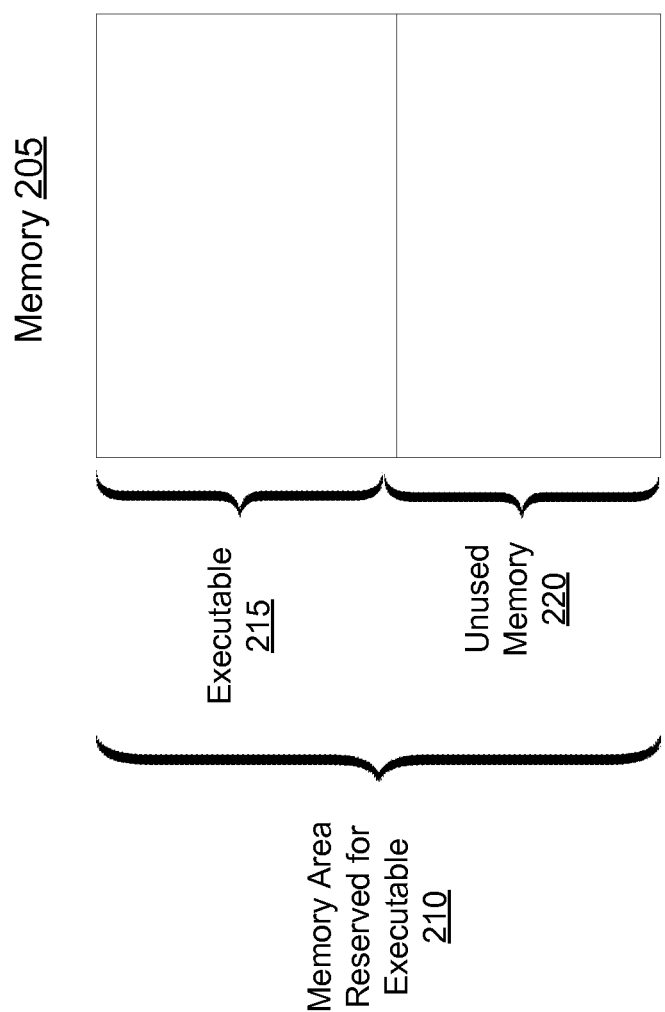
FIG. 2 illustrates a memory of an embedded system, in accordance with one embodiment.

Referring to FIG. 2, a memory 205 of an embedded system is shown. The memory 205 may be a memory of a communication module in the embedded system or a host memory. On embedded devices, there rarely are files. Instead, an executable program (executable 215) is usually placed inside Flash or other non-volatile memory, which is of fixed size. In some devices, executables are executed directly from the non-volatile memory such as Flash. In other embodiments, executables are loaded from non-volatile memory (e.g., Flash) into volatile memory (e.g., random access memory (RAM)) for execution. The volatile memory may have a size that is the same as or smaller than the non-volatile memory.

As shown, the memory 205 has a memory area 210 that is reserved for an executable. The memory area 210 reserved for the executable includes a first portion 215 that is occupied by an executable installed on the memory 205. The memory area 210 also typically includes a second portion 220 that is unused memory (spare or free space). Accordingly, new versions of the executable will have some room to grow to. The executable is typically mapped to be in one contiguous region. Similarly, the unused memory 220 (free space) is typically mapped to another contiguous region.

To patch traditionally generated executables, the unused memory 220 should be approximately the same size as, or slightly smaller than, the executable to enable a patch or update to temporarily be loaded into the memory 205. This is because it is common for the patch or update to be close to the size of the executable 215. Thus, the unused memory 220 is commonly about the size of the executable 215 to accommodate such large patches and updates. Embodiments described herein enable the unused memory 220 to be smaller than the executable 215, and in some instances significantly smaller than the executable 215.

Figure 3:
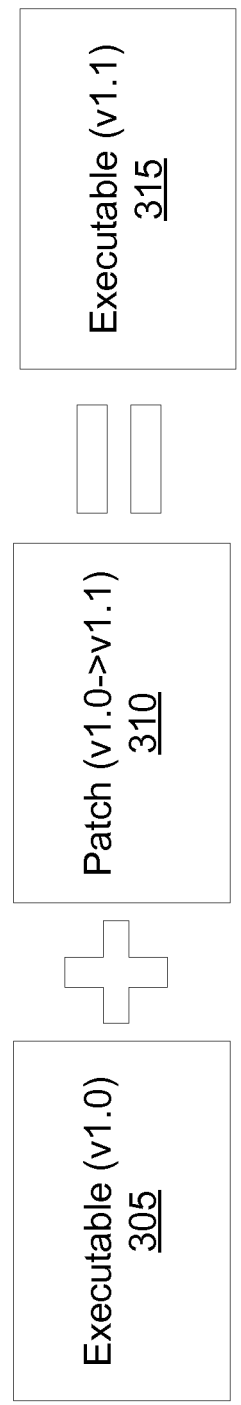
FIG. 3 illustrates an example patch being applied to a first version of an executable to cause the first version of the executable to become a second version of the executable.

FIG. 3 illustrates an example patch 310 being applied to a first version (V1.0) of an executable 310 to cause the first version of the executable 305 to become a second version (V1.1) of the executable 315. For the patch to be applied, the patch 310 is installed in the unused region of memory 220. The patch 310 may then be executed to update the first version of the executable 305 installed on the memory 205 into the second version of the executable 315. After the update is complete, the patch may be deleted from the unused portion of memory 220.

Referring back to FIG. 1, in one embodiment server computing device 125 includes a linker 160 and a padding module 165. In another embodiment, the padding module 165 may be a component of linker 160.

Linker 160 is a program that takes one or more input object files generated by a compiler and combines them into a single executable. Programs, applications and other executables included in software and firmware are frequently capable of performing many different functions. It is common for some of these different functions to be from modules contained within different object files. The linker 160 combines these different object files into a single unified executable.

To combine multiple object files into a single executable, the linker 160 identifies symbols associated with each object file. Each symbol identifies a particular function or field of data from an object file. The symbols may be used by functions to refer to other functions and/or fields of data originally from the same or other object files.

The linker 160 determines a memory layout for the executable by arranging all of the functions and data from the multiple object files into an address space. Each function and field of data may be assigned a memory location and a size (e.g., beginning and ending memory offset) by the linker 160. The linker 160 additionally resolves references between the functions and the data. The data becomes statically allocated data once the location of the data is fixed in the executable.

Figure 4A:
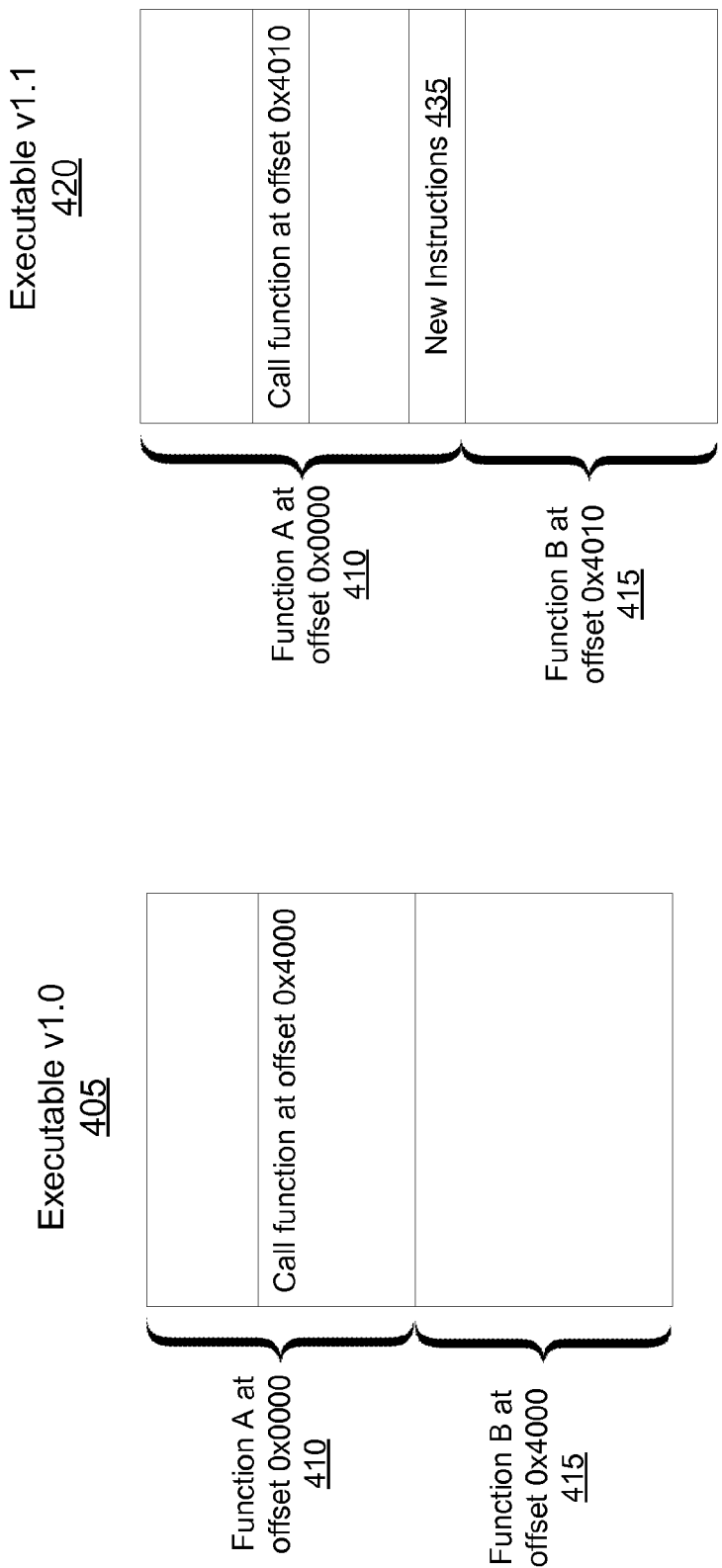
FIG. 4A shows a memory layout of an executable that has been generated without inserting padding.
Figure 4B:
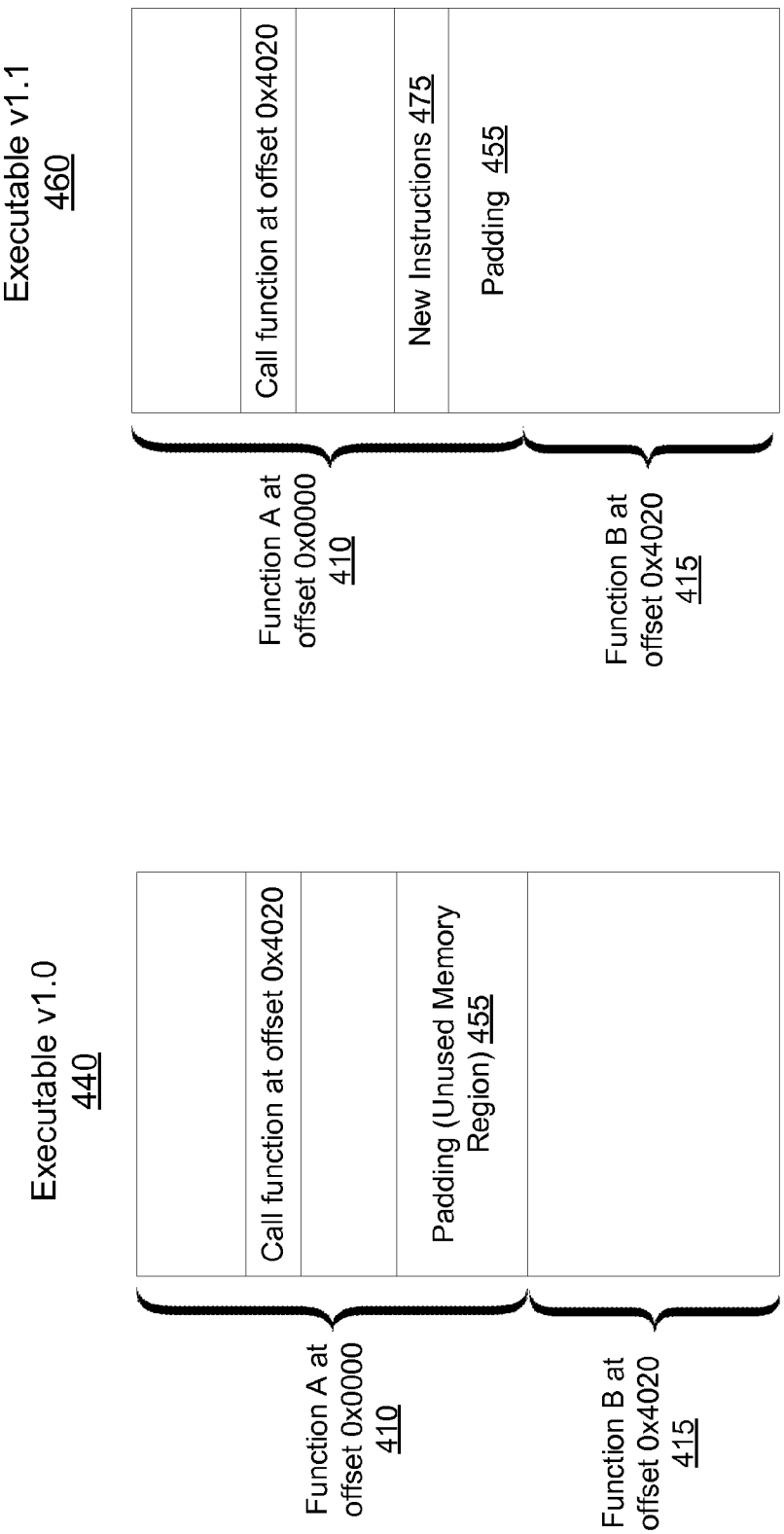
FIG. 4B shows a memory layout of an executable that has been generated with inserted padding, in accordance with embodiments described herein.

FIGS. 4A and 4B illustrate examples of executables that have been generated by a linker (e.g., by linker 160 of FIG. 1). FIG. 4A shows memory layouts of an executable that has been generated without inserting padding. In contrast, FIG. 4B shows memory layouts of an executable that has been generated with inserted padding, in accordance with embodiments described herein.

Referring to FIG. 4A, an example executable contains two functions, including function A 410 and function B 415. A first version (V1.0) of the executable 405 includes function A 410 at offset 0x0000 and function B 415 at offset 0x4000. Function A 410 contains an instruction that will cause it to call function B 415. Because code has been compiled and linked, an address of function B 415 has been resolved when the first version of the executable 405 was created, and a reference to function B 415 has been updated with the exact memory address (0x4000) of that function. Thus, function A 410 can successfully call function B 415.

A second version (V1.1) of the executable 420 also includes function A 410 and function B 415. However, after fixes were made to function A 410 from the first version of the executable 405, function A 410 grew larger in the second version of the executable 420. In particular, new instructions 435 were added to function A 410. By function A 410 growing larger, this caused the memory location (offset) of function B 415 to change to offset 0x4010. Because function B 415 is now at a different location, the instruction inside function A 410 that calls function B 415 is now different. As a result, a patch that can be applied to the first version of the executable 405 to transform it into the second version of the executable 420 includes code for the new instructions 435 to be added to function A 410, code for updating the call instruction in function A 410, and code for updating the memory location of function B 415 (and any functions following function B), increasing a size of the patch.

Note that for simplicity, new instructions 435 are shown at the end of function A 410. In practice, the new instructions 435 would most likely be elsewhere within function A 410 (e.g., not at the end).

Referring now to FIG. 4B, an example executable contains the same two functions as shown in FIG. 4A, including function A 410 and function B 415. A first version (V1.0) of the executable 440 includes function A 410 at offset 0x0000 and function B 415 at offset 0x4020. The memory layout for the first version of the executable 440 has been modified from that shown in FIG. 4A by adding padding (reserved unused space) 455 between function A 410 and function B 415.

In one embodiment, functions and data belonging to an executable are placed more evenly (e.g., approximately evenly) over the memory region reserved for the executable. By adding padding between function A 410 and function B 415, they are provided room to grow from version to version without causing any functions to change offsets or calls to functions to change. Padding may also be placed between other functions, such that some or all of the functions included in the executable may be grown without causing subsequent functions to be moved. Moreover, padding may also be placed between fields or items of statically allocated data. Because of the added padding, function B 415 starts at offset 0x4020. Accordingly, function A 410 contains an instruction that will cause it to call function B 415 at offset 0x4020.

A second version (V1.1) of the executable 460 also includes function A 410 and function B 415. After fixes were made to function A 410 from the first version of the executable 440, function A 410 grew larger in the second version of the executable 460. In particular, new instructions are added to function A 410 as a result of a patch for the second version of the executable 460. However, the new instructions are added into the padding 455 allocated for function A 410, and thus do not cause function B 415 to be relocated. Accordingly, function B 415 remains at offset 0x4020 in the second version of the executable 460.

The instruction in function A 410 to call function B 415 does not change from the first version 440 to the second version 460 of the executable. As a result, a patch that can be applied to the first version of the executable 440 to transform it into the second version of the executable 460 does not include code to update the function call in function A 410 or the memory location of function B 415, reducing a size of the patch. Additionally, if either function A 410 or function B 415 were to have instructions removed between versions, additional padding would be introduced also without changing the offset of function B 415 or the instruction calling function B 415.

By reserving space (padding) for functions when the executable is first installed, differences between versions of the executable will be smaller, as a smaller number of instructions will change. This in turn makes a patch smaller. Accordingly, an amount of space that is reserved to enable patches to be decompressed and installed into memory may be reduced significantly. For example, in some traditional implementations the size of the executable is limited to about half the size of the memory to enable future patches. However, embodiments described herein enable the executable to consume a majority (e.g., up to 70% or more) of the memory.

Referring back to FIG. 1, the linker 160 determines a memory layout for the executable and additionally resolves references between the functions and the statically allocated data in the executable. In one embodiment, the padding module 165 determines which functions and/or items or fields of data to apply padding to, as well as how much padding to apply to the functions and/or data. How much padding to add between functions (and data) may depend on how much memory space is available, and what kind of changes are expected to be made to the software or firmware. Padding module 165 may apply one or multiple padding policies for allocating padding (unused memory regions) to functions and/or data.

Numerous different padding policies may be used to allocate padding to functions and data. Padding policies may assign weightings to functions and data based on age (e.g., such that newer functions and data are assigned higher weights due to an increased risk of future changes), size (e.g., such that higher weightings are assigned to larger functions and data), revision history (e.g., such that functions and data that have been recently changed or that have undergone frequent or numerous changes are assigned higher weightings), source (e.g., such that functions and data associated with stable libraries are assigned lower weightings), and other parameters of the data or functions. In one embodiment, a simple approach of applying an equal amount of padding to each function and/or data field is applied. Other more complicated padding policies are also possible. In one embodiment, different padding policies are applied for data than for functions.

For some functions, small changes may be anticipated, mostly due to bug fixes. The probability of a function needing bug fixes may depend on the size of the function. The bigger the function, the more likely it is to need fixes. Accordingly, the amount of padding that padding module 165 allocates to a function may be based on a size of the function.

A significant amount of third party source code may be included in an executable in some instances. In many instances, third party source is quite stable and undergoes only minimal or no changes. For example, the library libc or another traditionally stable library may be used in an executable. Accordingly, padding module 165 may not add between functions coming from stable third party libraries in some embodiments. For example, certain subsystems may be excluded from padding if these subsystems are identified by a pathname of the source file where a symbol is coming from (e.g., if the pathname is to a source file of a stable library). This same padding policy may be followed for statically allocated data.

In one embodiment, padding module 165 applies a padding policy that adds ~2% extra space between functions, where the 2% is a percentage of the size of the function that is being padded. In one embodiment, the amount of padding to add to a function may additionally be capped to 32 bytes (e.g., 16 instructions with ARM thumb instruction set).

Figure 5:
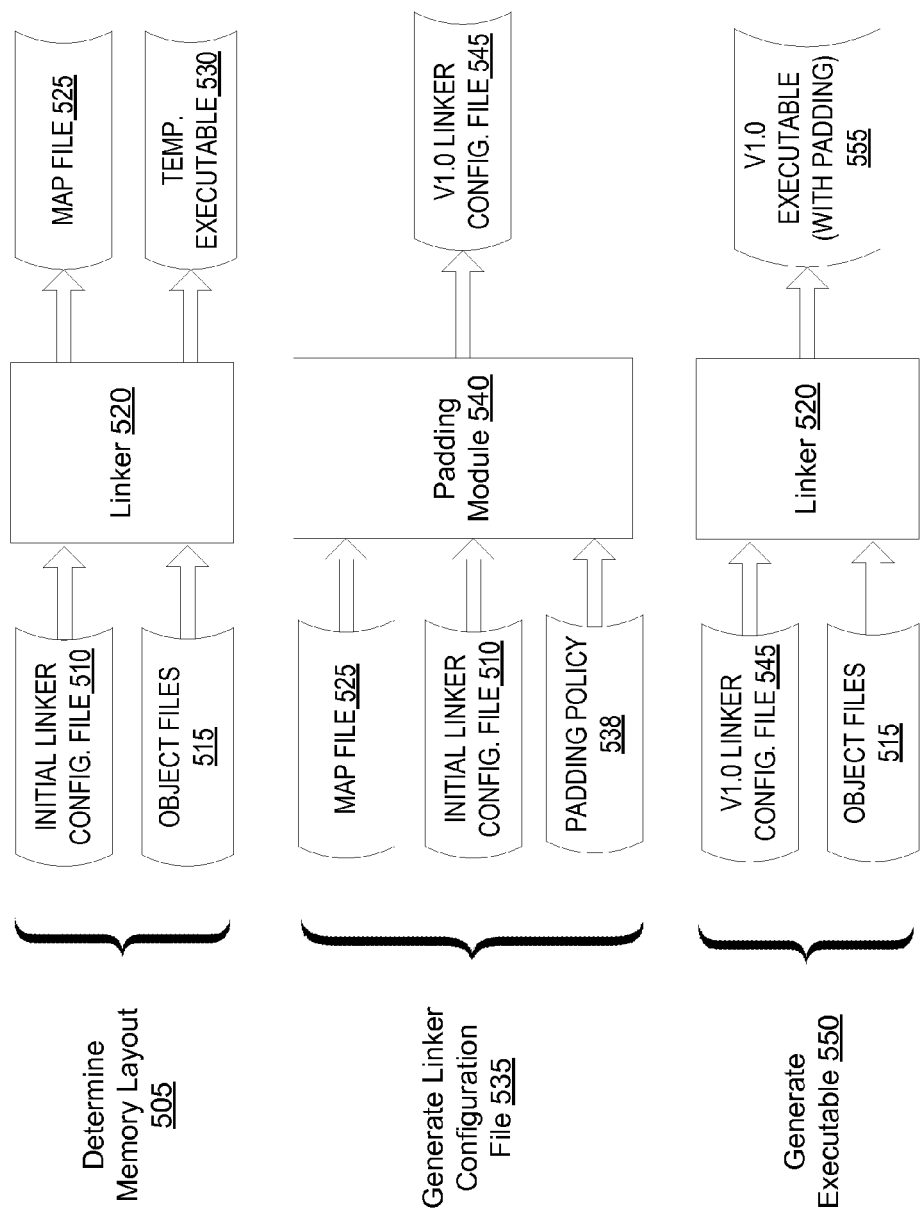
FIG. 5 illustrates a multi-stage process for generating a new executable with padding, in accordance with embodiments.

FIG. 5 illustrates a multi-stage process for generating a new executable with padding, in accordance with embodiments. In a first stage 505, a memory layout is determined for the new executable. In one embodiment, a linker 520 receives an initial linker configuration file 510 and one or more object files 515 as inputs.

Each of the object files 515 contains code for one or more functions and/or data that will be statically allocated. The initial linker configuration file 510 describes a target system memory layout, and where in a target system memory functions and data should be placed. Usually, the instructions in the initial linker configuration file 510 are not specific, as the exact location of a function doesn't normally matter that much. For example, the initial linker configuration file 510 may identify a memory region (e.g., a starting and ending memory offset) that is reserved for an executable in the target system, but not identify where specific functions will be placed.

The linker 520 takes in multiple object files 515, and lays out the functions and data from these object files 515 to their places in memory in accordance with the constraints imposed by the initial linker configuration file 510. The linker 520 additionally resolves references between the functions and/or statically allocated data in the object files 515.

The linker 520 can create a map file 525 containing information about symbols that were placed in the executable, the symbols having been created for functions and statically allocated data (e.g., global variables). The map file 525 has information about the size of these symbols, and their locations in memory. The linker 520 additionally outputs an executable 530. However, this executable 530 is a temporary executable, and is typically discarded.

In a second stage 535, a new linker configuration file (V1.0 linker configuration file) 545 is created. To create the V1.0 linker configuration file 545, a padding module 540 receives as an input map file 525, the initial linker configuration file 510 and a padding policy 538. The padding module 540 determines one or more properties of the functions and/or statically allocated data from the symbols in the map file 525. The padding module 540 then applies the padding policy 538 based on these determined properties to determine which symbols (e.g., which functions and/or statically allocated data) to allocate padding to as well as how much padding to allocate. Note that the padding module 540 may additionally receive additional inputs providing information such as a revision history of object files 515 and/or of specific functions and/or data within the object files, a source of the object files (e.g., a path for the object files and/or a source of the object files), and so on. This additional data may be taken into consideration by the padding module 540 in accordance with the padding policy 538.

Padding module 540 generates new rules for placing and sizing symbols (e.g., functions and/or data) based on the determined padding to be allocated. These rules are then inserted into the initial linker configuration file 510 to create the new v1.0 linker configuration file 545. In one embodiment, padding module 540 specifies specific offsets at which to place each of the functions and fields of statically allocated data. The specific placement may space functions apart to include the allocated padding.

In one embodiment, padding module 540 additionally rearranges one or more functions and/or data for performance optimization. For example, a first function which is called from a performance critical path might be placed close to a caller (e.g., a second function that will call on the first function), which can give performance benefits due to caching and/or memory prefetching. Additionally, such close placement of the function to be called to the caller can reduce a size of the instruction making the function call or the variable reference. Thus, the new linker configuration file may specify locations for functions that cause them to be rearranged as compared to an original executable.

Note that in an alternative embodiment, the padding module 540 may be integrated into the linker 520. In such an embodiment, rather than or in addition to generating map file 525 as an output, linker 520 may perform the above described operations and generate v1.0 linker configuration file 545 as an output.

In a third stage 550, an executable with padding is generated. The v1.0 linker configuration file 545 including the rules for placing and sizing symbols is provided as input to linker 520 along with the object files 515. An output is a new v1.0 executable that includes padding for one or more of the functions and/or for the data. The final output is an executable where functions are spaced such that there is some room to grow. Accordingly, this creates a version of executable 555 against which relatively small patches can be created.

The v1.0 linker configuration file 545 may be stored. When a new version of software or firmware is being built, this linker configuration file 545 may be used as input along with new object files. The new version of software or firmware will have almost all the functions and variables in the same locations in memory, and the patch between these versions will be small. In some cases, functions and data can grow to be bigger than the space they were allocated (e.g., may fill the provided padding). In such instances, the memory locations of functions and/or data may change, and ne padding may or may not be inserted between functions.

Figure 6:
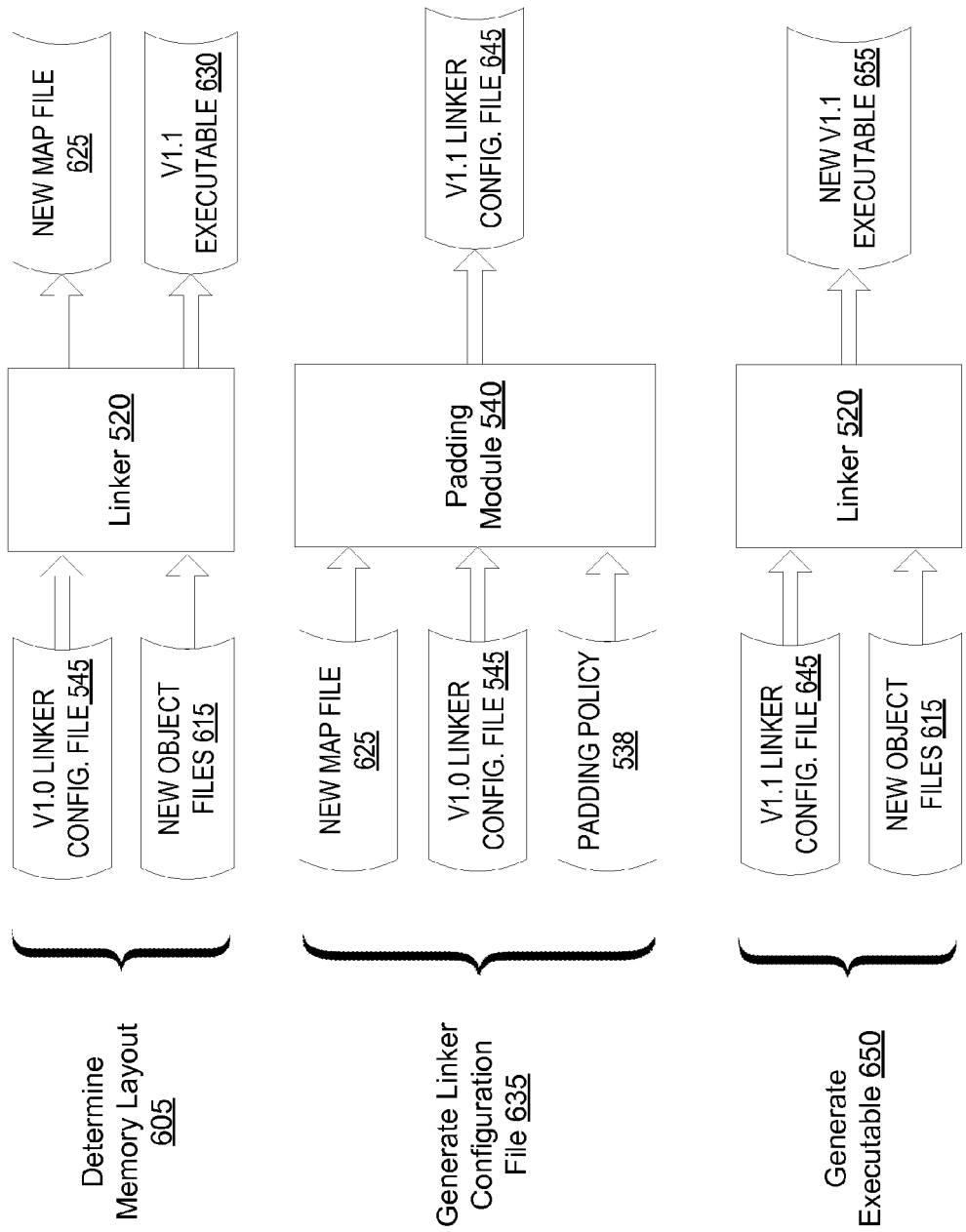
FIG. 6 shows a multi-stage linking process for creating an updated version of an executable.

FIG. 6 shows a multi-stage linking process for creating an updated version of an executable. In a first stage 605, a memory layout for the new version (v1.1) of the executable is determined. A linker configuration file from a previous release (e.g., v1.0 linker configuration file 545) is used as an input into linker 520 along with a set of object files that may include new or updated object files 615. In some cases one or more original object files may also be provided (e.g., for object files that have not been changed). The v1.0 linker configuration file 545 may specify the memory locations for all preexisting functions and data to correspond to those memory locations used for these functions and data in the v1.0 executable. Linker 520 outputs a v1.1 executable 630, and may additionally output a new map file 625. The new map file 625 may additionally specify unchanged memory locations for preexisting functions and/or data. The v1.1 executable 630 may have additional instructions added into what had been padding in the initial version. In some instances, the v1.1 executable 630 is used as the final executable, and a patch is generated therefrom that will cause a v1.0 executable 630 to become the v1.1 executable. However, if new functions and/or new data is included in the new object files, the v1.1 executable 630 will not include padding added to those new functions or the new data.

If padding is to be added to new functions and/or data, the multi-stage linking process continues to a second stage 635, in which a new linker configuration file (V1.1 linker configuration file) 645 is created. To create the V1.1 linker configuration file 645, padding module 540 (or linker 520 in some embodiments) receives as an input map file 625, the v1.0 linker configuration file 545 and a padding policy 538. The padding module 540 determines one or more properties of the functions and/or statically allocated data from the symbols in the map file 625. The padding module 540 then applies the padding policy 638 based on these determined properties to determine which new symbols (e.g., which new functions and/or statically allocated data) to allocate padding to as well as how much padding to allocate. Padding module 540 generates new rules for placing and sizing the new symbols (e.g., new functions and/or data) based on the determined padding to be allocated. These rules are then inserted into the v1.0 linker configuration file 545 to create the new v1.1 linker configuration file 645. In one embodiment, the specific memory locations (e.g., offset) for each new function and/or data field are added to the new v1.1 linker configuration file.

In one embodiment, the padding policy 538 specifies that all preexisting functions and/or data are to keep the same memory location that they had in the v1.0 executable. This ensures that the padding module 540 will not rearrange the functions and data between v1.0 and v1.1. Accordingly, the v1.1 linker configuration file 645 may specify the memory locations for all of the preexisting functions and/or data, which would correspond to the same memory locations for these functions and data in the v1.0 executable. In some instances one or more functions or data may exceed the size of a previously allocated padding for those functions or data. In such an instance, the memory locations for some functions and/or data may change.

In a third stage 650, a new executable with padding is generated. The v1.1 linker configuration file 645 including the rules (e.g., specific instructions) for placing and sizing the new symbols is provided as input to linker 520 along with the new object files 615. An output is a new v1.1 executable 655 that includes padding for one or more of the new functions and/or statically allocated data. The executable 655 may also include additional instructions in the padding that had been reserved for various functions or data.

In one embodiment, the software or firmware update is distributed as a patch. The device on which the original executable is installed (and on which the patch will be installed) may have a limited amount of memory (e.g., Flash) where the patch and the executable can be stored. The patch has a much smaller size as compared to traditional patches, and so places a smaller memory resource burden on the memory. With smaller requirements on memory for storing the patch, device manufacturers can include more improvements within a software or firmware update. Additionally, less memory space may be reserved for patching as opposed to memory requirements of traditional patching practices. Developers can therefore include more software features in a product such as an embedded system that is resource-constrained (e.g., has minimal memory), as the developer can allocate more of the memory (e.g., more Flash space) for the actual executable.

Figure 7A:
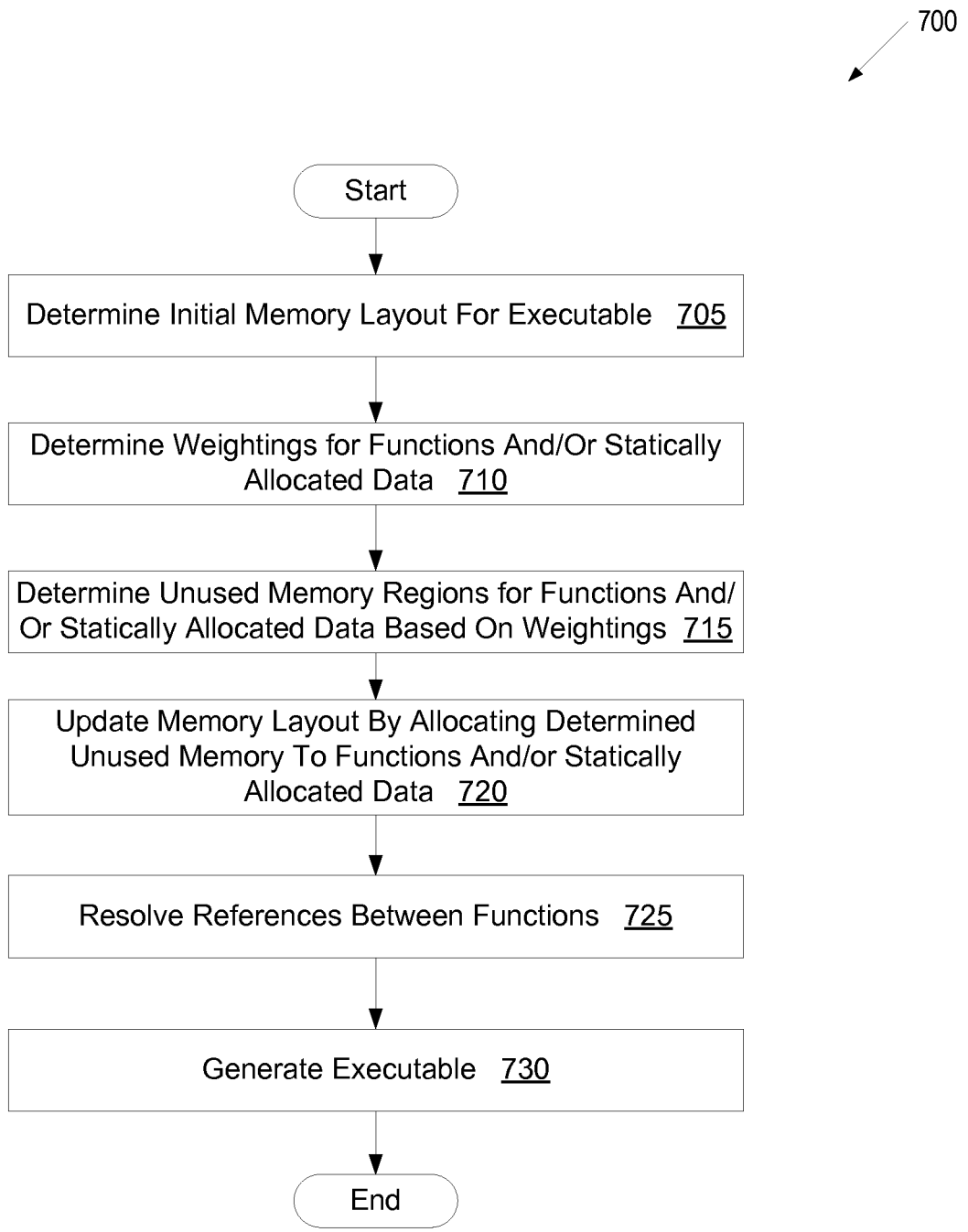
FIG. 7A is a flow diagram of an embodiment for a method of generating an executable with padding (unused memory regions) allocated to functions and/or data.
Figure 7B:
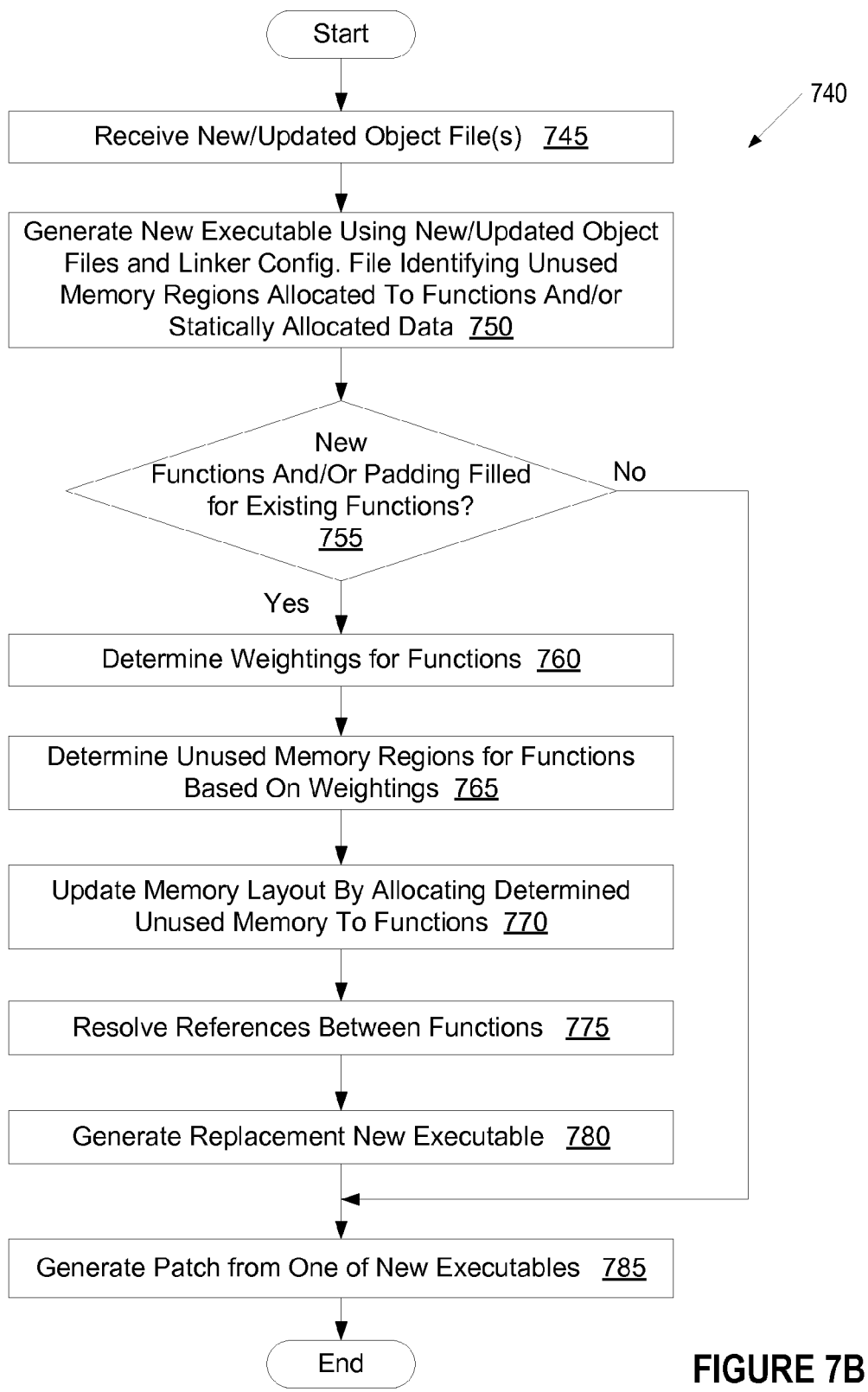
FIG. 7B is a flow diagram of an embodiment for a method of generating a patch for an executable with padding allocated to functions and/or data.

FIGS. 7A-7B are flow diagrams of various embodiments of methods for generating executables with additional unused memory regions (padding) allocated to functions and/or data. The methods are performed by processing logic that may include hardware (circuitry, dedicated logic, etc.), software (such as is run on a general purpose computer system or a dedicated machine), firmware, or some combination thereof. In one implementation, the methods may be performed by a computing device 135 or server computing device 125 of FIG. 1 (e.g., by a linker 160 and/or padding module 165 running in server computing device 125).

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

FIG. 7A is a flow diagram of an embodiment for a method 700 of generating an executable with padding (unused memory regions) allocated to functions and/or data. At block 705 of method 700, processing logic determines an initial memory layout for an executable. In one embodiment, the initial memory layout is represented in a map file determined by providing an initial linker configuration file and object files to a linker, as described in first stage 505 of FIG. 5.

At block 710, processing logic determines weights for functions and/or statically allocated data to be included in the executable. The weights may be determined based on properties of the functions and/or data as well as one or more padding policies. For example, weights may be based on a size of a function or data, a revision history of a function or data, a source of the function or data, an age of the function or data, a path associated with the function or data, and so on. Higher weights may be determined for functions and data that have a higher likelihood of being modified in future versions of the executable.

At block 715, processing logic determines unused memory regions (padding) for functions and/or statically allocated data based on the weightings. In one embodiment, processing logic allocates larger unused memory regions (more padding) to functions and data with higher weightings. This balances the extra memory consumed by the functions and data by adding padding verses the cost of modifying a function or data if there is insufficient padding to accommodate the modification. In one embodiment, the operations of blocks 710 and 715 correspond to the second stage 535 of FIG. 5.

At block 720, processing logic updates the memory layout by allocating the determined unused memory to functions and/or statically allocated data. In one embodiment, processing logic generates a new linker configuration file that includes rules or instructions for the sizing and placement of functions and data.

At block 725, processing logic resolves references between functions. At block 730, processing logic generates an executable that includes padding between functions and/or data (e.g., includes unused memory regions allocated to one or more functions and/or data). In one embodiment, the operations of blocks 725-730 correspond to the third stage 550 of FIG. 5.

FIG. 7B is a flow diagram of an embodiment for a method 740 of generating a patch for an executable with padding allocated to functions and/or data. At block 745 of method 740, processing logic receives new and/or updated object files. At block 750, processing logic generates a new executable using the new and/or updated object files and a linker configuration file that identifies unused memory regions that were allocated to functions and/or statically allocated data in a previous version of the executable. In the new executable, the locations of existing functions may not change because new instructions have been added to padding previously allocated to these functions. If the locations of functions are unchanged, then the instructions that call these functions are also unchanged. Similarly, if statically allocated data is updated to add new data fields, the locations of data may not change so long as the new data fields fit in padding allocated to the statically allocated data. In one embodiment, the operations of blocks 745-750 correspond to the first stage 605 described in FIG. 6.

At block 755, processing logic determines whether any new functions and/or new statically allocated data has been added to the new executable that were not included in the previous version of the executable. Processing logic may also determine whether the padding (unused memory region) allocated to a function or data has been filled and exceeded in the new executable. This would likely cause existing functions to move and call instructions that call such functions to change. If new functions or data have been added, or padding associated with a function or data has been exceeded, the method continues to block 760. Otherwise, the method proceeds to block 785.

At block 760, processing logic determines weightings for the new and/or existing functions and data. At block 765, processing logic determines unused memory regions (padding) for functions and/or data based on the weightings. In some embodiments, weightings are determined only for new functions and data and for functions and data whose allocated padding has been exceeded. Alternatively, weightings may be computed for all functions and data in the executable. In one embodiment, a new linker configuration file is generated based on the determined unused memory regions to be allocated to functions and or data. In one embodiment, the operations of block 760-765 correspond to the second stage 635 of FIG. 6.

At block 770, processing logic updates a memory layout by allocating the determined unused memory regions to the functions and/or data. At block 775, processing logic resolves references between the functions and/or data. At block 780, processing logic generates a replacement new executable that includes padding (unused memory regions) allocated to the functions and/or data. In one embodiment the operations of blocks 770-780 correspond to the third stage 650 of FIG. 6.

At block 785, processing logic generates a patch from one of the new executables. If the answer at block 755 was no, then the patch may be generated from the new executable that has not added padding to new functions and/or adjusted the padding for existing functions. If the answer at block 755 was yes, then the patch may be generated from the replacement new executable that includes padding for new functions and/or data.

Figure 8:
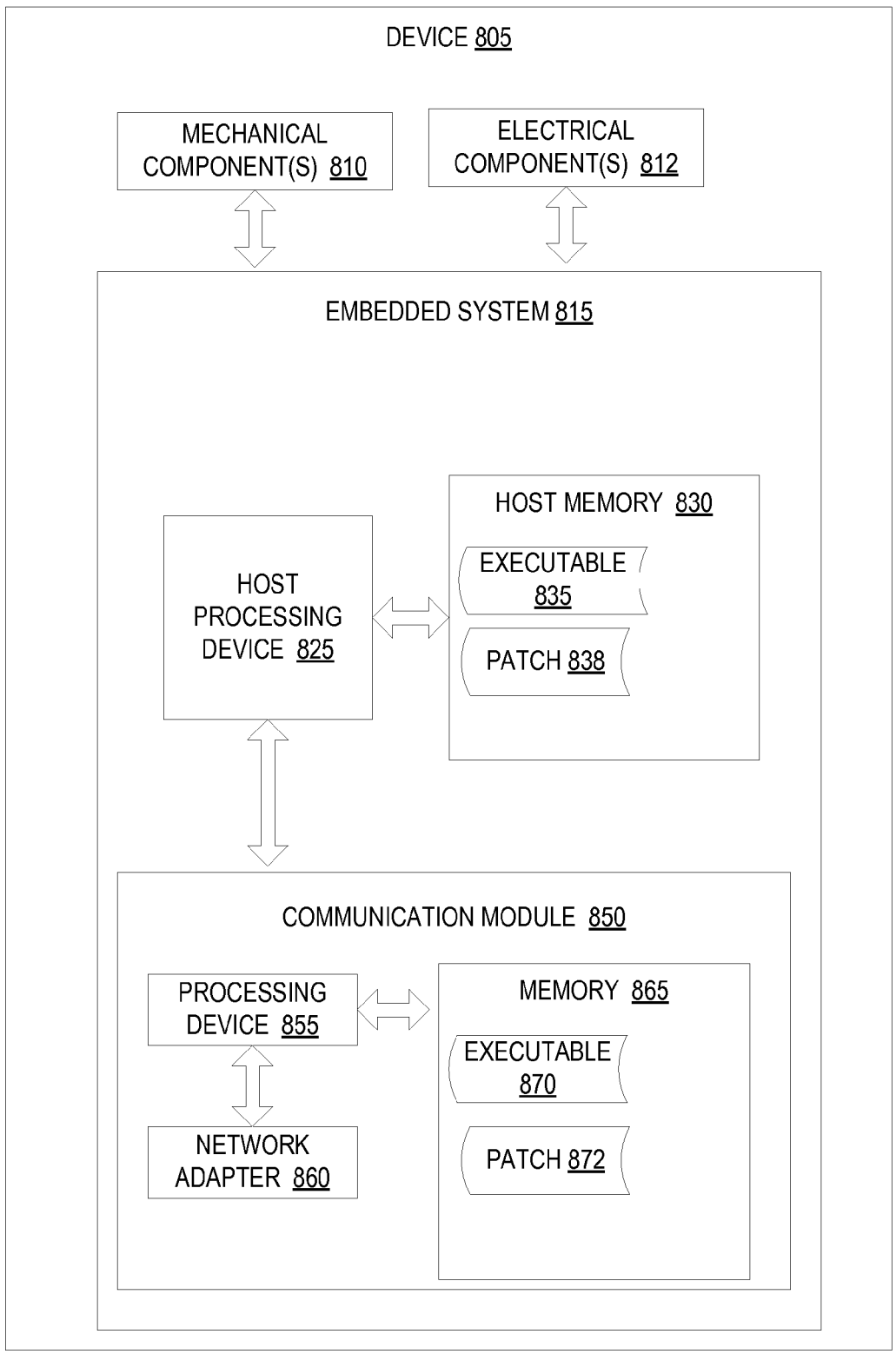
FIG. 8 is a block diagram of an example device having a remotely accessible embedded system, in accordance with one embodiment.

FIG. 8 is a block diagram of an example device 805 having a remotely accessible embedded system 815. The device 805 may include, for example, electrical appliances such as refrigerators, ovens, washers, driers, dishwashers, thermostats, alarms, air conditioners, televisions, radios, receivers, amplifiers, and so forth. The device 805 may also include consumer devices such as digital watches, music players, game consoles, digital cameras, printers, and so forth. Other examples of devices include stationary devices such as HVAC systems, traffic lights, factory controllers, signs, electronic billboards, sprinkler systems, and irrigation control systems, as well as medical devices. Device 805 may also be any other type of device that includes an embedded system.

In one embodiment, the device 805 includes mechanical components 810, electrical components 812 and an embedded system 815. The electrical components 812 and/or mechanical components 810 may include sensors, programmable logic controllers (PLCs), switches, motors, valves, actuators, and so forth.

The embedded system 815 may include a host processing device 825, a host memory 830 and/or a communication module 850 coupled to the host processing device 825. The embedded system 815 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 825 may be a microcontroller or a digital signal processor (DSP) in one embodiment. Host processing device 825 may alternatively or additionally include a programmable logic controller (PLC), a field programmable gate array (FPGA) or a complex programmable logic device (CPLD). The host processing device 825 may be configured to perform specific functions related to the operation and control of the device 805.

Host memory 830 may include random access memory (RAM), read only memory (ROM), one time programmable (OTP) ROM, Flash (e.g., NOR Flash), or other types of memory. Host memory 830 may store an application programming interface (API) for the communication module 850. The API may enable the host processing device 825 to send commands and/or data to and receive commands and/or data from communication module 850. Host memory 830 may also include firmware and/or software that includes an executable 835 for the host processing device 825 that configures the host processing device to perform one or more operations that are specific to device 805. For example, host memory 830 may include an executable that has been generated in accordance with embodiments of the present invention, as described above. In some instances, a patch 838 generated in accordance with embodiments discussed herein is temporarily stored in host memory 830. The patch may be executed to update executable 835, after which the patch 838 may be deleted from host memory 830. Because the executable 835 and patch 838 have been created in accordance with embodiments described herein, the size of the patch may be much smaller than traditional patches. Thus, the executable 835 may consume a larger portion of the host memory 830 than may be permissible in other resource constrained devices.

In some embodiments, the host memory 830 may be integrated into the host processing device 825. For example, microcontrollers typically include a processor core, memory and programmable input/output peripherals. Accordingly, if the host processing device 825 is a microcontroller, then host memory 830 may be a memory of host processing device 825.

Communication module 850 may be an integrated circuit (IC) that is configured to be coupled to host processing device 825 of embedded system 815. Communication module 850 may be provided by a third party to a manufacturer of the device, and may enable network capability and remote control capability to be easily added to the device 805. The communication module 850 may include its own processing device 855, a memory 865 and/or a network adapter 860. The processing device 855 may be a microcontroller, a DSP, a PLC, a microprocessor or programmable logic device such as an FPGA or a CPLD. The memory may include a non-volatile memory (e.g., RAM) and/or a volatile memory (e.g., ROM, Flash, etc.). In one embodiment, memory 865 is integrated into processing device 855. Memory 865 may store an executable 870 for execution by the processing device 855, such as an executable that has been generated in accordance with embodiments of the present invention as described above. Memory 865 may also temporarily store a patch 872 created in accordance with embodiments described herein.

Network adapter 860 may be a wired network adapter (e.g., an Ethernet adapter) or a wireless network adapter (e.g., a Wi-Fi adapter or other wireless local area network (WLAN) adapter). Network adapter 860 may also be configured to provide connection to a network or other devices using Zigbee, PLC, Bluetooth, 6LowPAN, or other communication protocols. Network adapter 860 may receive notifications and other messages from a WAN accessible service and/or remote control applications. Network adapter 860 may additional send outgoing messages to the WAN accessible service and/or to remote control applications.

Figure 9:
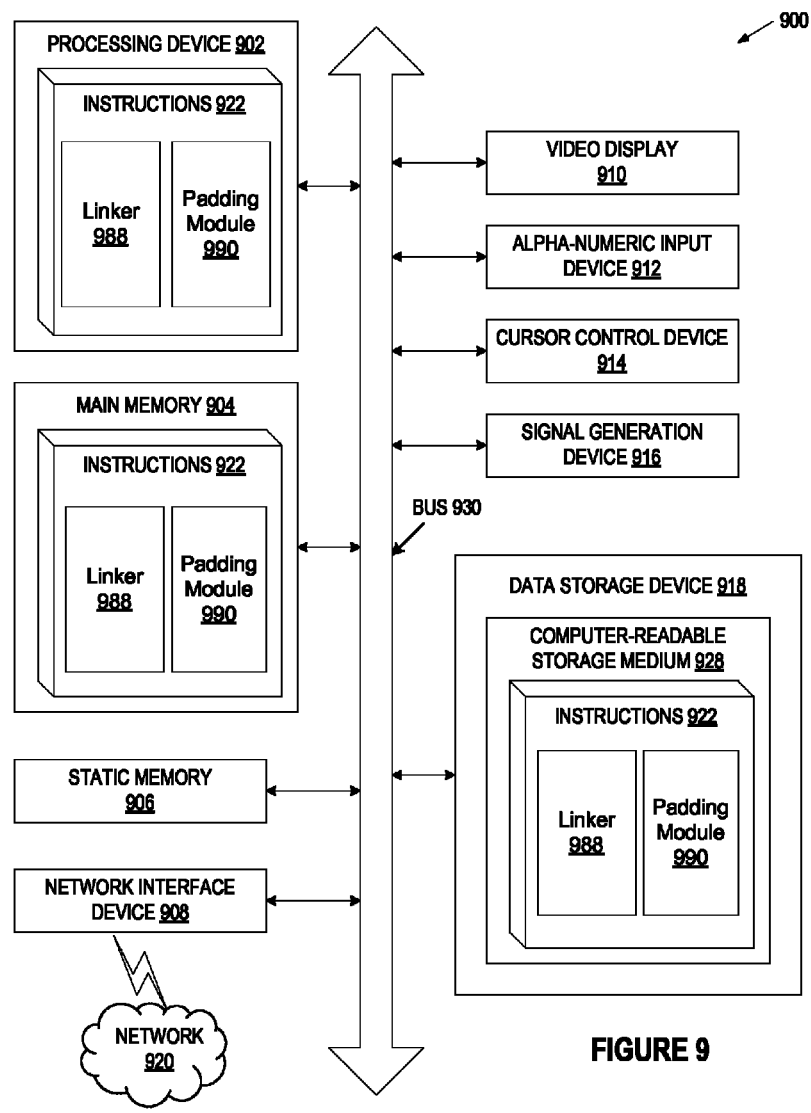
FIG. 9 illustrates a diagrammatic representation of a machine in the example form of a computing device within which a set of instructions, for causing the machine to perform any one or more of the methodologies discussed herein, may be executed.

FIG. 9 illustrates a diagrammatic representation of a machine in the example form of a computing device 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiment, computing device 900 corresponds to server computing device 125 or computing device 135 of FIG. 1.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 930.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 922) for performing the operations discussed herein.

The computing device 900 may further include a network interface device 908. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium (or more specifically a computer-readable storage medium) 928 on which is stored one or more sets of instructions 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting computer-readable storage media.

The computer-readable storage medium 928 may also be used to store a linker 988 and/or padding module 990 that creates executables as described in embodiments, and/or a software library containing methods that call such a linker 988 and/or padding module 990. While the computer-readable storage medium 928 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, the non-transitory media including solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "linking", "mapping", "determining", "updating", "resolving", "generating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or other type of machine-accessible storage media.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   determining, by a processing device, a memory layout for an executable comprising a plurality of functions and data, wherein determining the memory layout comprises processing one or more object files using a linker and a first linker configuration file to generate a map file, the first linker configuration file comprising one or more initial constraints for the memory layout;
   identifying a separation between a first function and a second function of the plurality of functions, wherein the first function is to call the second function;
   generating a second linker configuration file based on the map file, the first linker configuration file and a padding policy for inserting unused memory regions to the plurality of functions, the second linker configuration file comprising the one or more initial constraints and a plurality of additional constraints based on the map file and the padding policy, the second linker configuration file further comprising a first constraint specifying a first location of the first function and a second constraint specifying a second location of the second function, wherein the first constraint and the second constraint cause a location of at least one of the first function or the second function to be rearranged to reduce the separation;
   updating, by the processing device, the memory layout based on re-processing the one or more object files using the linker and the second linker configuration file, wherein updating the memory layout comprises rearranging the location of at least one of the first function or the second function and inserting an unused memory region between the first function and the second function in the memory layout;
   resolving references between the plurality of functions; and
   generating an executable comprising the plurality of functions and the data arranged in accordance with the memory layout, the executable having the resolved references.

2. The method of claim 1, further comprising:
   receiving an updated object file comprising one or more new instructions for the first function; and
   generating a patch for the executable based on the updated object file, wherein the patch is to write the one or more new instructions into the unused memory region without adjusting the memory layout or the references between the plurality of functions.

3. The method of claim 1, further comprising:
   determining a weighting to apply to the first function based on one or more properties of the first function; and
   determining a size for the unused memory region based on the weighting.

4. The method of claim 3, wherein the one or more properties of the first function comprise at least one of an age of the first function or a path of the first function.

5. The method of claim 1, further comprising:
   determining that a source of the second function is a third party library; and
   determining not to insert an additional unused memory region between the second function and a third function of the plurality of functions based on the source of the second function.

6. The method of claim 1, further comprising:
allocating an additional unused memory region to the data, wherein a first policy is used to allocate the unused memory region to the function and a second policy is used to allocate the additional unused memory region to the data.

7. The method of claim 1, wherein the map file comprises symbols for the plurality of functions and the data, information about sizes of the plurality of functions and the data, and memory locations for the plurality of functions and the data.

8. The method of claim 7, further comprising:
receiving an updated version of an object file of the one or more object files;
processing the one or more object files including the updated version of the object file using the linker and the second linker configuration file to generate a new map file;
generating a third linker configuration file based on the new map file; and
re-processing the one or more object files including the updated version of the object file using the linker and the third linker configuration file.

9. A non-transitory computer readable storage medium having instructions that, when executed by a processing device, cause the processing device to perform operations comprising:
determining, by the processing device, a memory layout for an executable comprising a plurality of functions and data, wherein determining the memory layout comprises processing one or more object files using a linker and a first linker configuration file to generate a map file, the first linker configuration file comprising one or more initial constraints for the memory layout;
identifying a separation between a first function and a second function of the plurality of functions, wherein the first function is to call the second function;
generating a second linker configuration file based on the map file, the first linker configuration file and a padding policy for inserting unused memory regions to the plurality of functions, the second linker configuration file comprising the one or more initial constraints and a plurality of additional constraints based on the map file and the padding policy, the second linker configuration file further comprising a first constraint specifying a first location of the first function and a second constraint specifying a second location of the second function, wherein the first constraint and the second constraint cause a location of at least one of the first function or the second function to be rearranged to reduce the separation;
updating, by the processing device, the memory layout based on re-processing the one or more object files using the linker and the second linker configuration file, wherein updating the memory layout comprises rearranging the location of at least one of the function or the second function and inserting an unused memory region between a first third function and a fourth function of the plurality of functions in the memory layout, wherein the third function and the fourth function have adjacent memory locations in the memory layout prior to insertion of the unused memory region;
resolving references between the plurality of functions; and
generating an executable comprising the plurality of functions and the data arranged in accordance with the memory layout, the executable having the resolved references.

10. The computer readable storage medium of claim 9, the operations further comprising:
receiving an updated object file comprising one or more new instructions for the third function; and
generating a patch for the executable based on the updated object file, wherein the patch is to write the one or more new instructions into the unused memory region without adjusting the memory layout or the references between the plurality of functions.

11. The computer readable storage medium of claim 9, the operations further comprising:
determining a weighting to apply to the third function based on one or more properties of the third function; and
determining a size for the unused memory region based on the weighting.

12. The computer readable storage medium of claim 11, wherein the one or more properties of the third function comprise at least one of a size of the third function or a revision history of the third function.

13. The computer readable storage medium of claim 9, the operations further comprising:
determining that a source of the first function is a stable library that is infrequently modified; and
determining not to insert an additional unused memory region between the first function and the second function based on the source of the first function.

14. The computer readable storage medium of claim 9, the operations further comprising:
allocating an additional unused memory region to the data, wherein a first policy is used to allocate the unused memory region to the third function and a second policy is used to allocate the additional unused memory region to the data.

15. The computer readable storage medium of claim 9, wherein the map file comprises symbols for the plurality of functions and the data, information about sizes of the plurality of functions and the data, and memory locations for the plurality of functions and the data.

16. The computer readable storage medium of claim 15, the operations further comprising:
receiving an updated version of an object file of the one or more object files;
processing the one or more object files including the updated version of the object file using the linker and the second linker configuration file to generate a new map file;
generating a third linker configuration file based on the new map file; and
re-processing the one or more object files including the updated version of the object file using the linker and the third linker configuration file.

17. A computing device comprising:
a memory; and
a processing device coupled to the memory, the processing device to:
determine a memory layout for an executable comprising a plurality of functions and data, wherein determining the memory layout comprises processing one or more object files using a linker and a first linker configuration file to generate a map file, the first linker configuration file comprising one or more initial constraints for the memory layout;
identify a separation between a first function and a second function of the plurality of functions, wherein the first function is to call the second function;

generate a second linker configuration file based on the map file, the first linker configuration file and a padding policy for inserting unused memory regions to the plurality of functions, the second linker configuration file comprising the one or more initial constraints and a plurality of additional constraints based on the map file and the padding policy, the second linker configuration file further comprising a first constraint specifying a first location of the first function and a second constraint specifying a second location of the second function, wherein the first constraint and the second constraint cause a location of at least one of the first function or the second function to be rearranged to reduce the separation;

update the memory layout based on re-processing the one or more object files using the linker and the second linker configuration file, wherein updating the memory layout comprises rearranging the location of at least one of the first function or the second function and inserting an unused memory region between the first function and the second function in the memory layout;

resolve references between the plurality of functions; and generate an executable comprising the plurality of functions and the data arranged in accordance with the memory layout, the executable having the resolved references.

18. The computing device of claim 17, wherein the processing device is further to:

receive an updated object file comprising one or more new instructions for the first function; and generate a patch for the executable based on the updated object file, wherein the patch is to write the one or more new instructions into the unused memory region without adjusting the memory layout or the references between the plurality of functions.

19. The computing device of claim 17, wherein the map file comprises symbols for the plurality of functions and the data, information about sizes of the plurality of functions and the data, and memory locations for the plurality of functions and the data.

20. The computing device of claim 19, wherein the processing device is further to:

receive an updated version of an object file of the one or more object files;

process the one or more object files including the updated version of the object file using the linker and the second linker configuration file to generate a new map file;

generate a third linker configuration file based on the new map file; and re-process the one or more object files including the updated version of the object file using the linker and the third linker configuration file.

* * * * *